United States Patent [19]
Iwasaki et al.

[11] Patent Number: 5,303,335
[45] Date of Patent: Apr. 12, 1994

[54] IMAGE FORMING APPARATUS

[75] Inventors: Yoichi Iwasaki; Akihiro Nishi, both of Kobe; Satoshi Yoshida, Machida, all of Japan

[73] Assignee: Minolta Camera Kabushiki Kaisha, Osaka, Japan

[21] Appl. No.: 753,103

[22] Filed: Aug. 30, 1991

[30] Foreign Application Priority Data

Aug. 31, 1990 [JP] Japan .................. 2-231194

[51] Int. Cl.⁵ .................................. G06F 15/00
[52] U.S. Cl. ........................... 395/111; 395/101
[58] Field of Search .......... 395/111, 102, 117, 112, 395/106, 101; 355/308, 318, 323; 358/296; 400/61, 76; 271/285-298, 185, 184

[56] References Cited

U.S. PATENT DOCUMENTS

| | | | |
|---|---|---|---|
| 4,208,122 | 6/1980 | Iwamoto et al. | 355/14 R |
| 4,307,958 | 12/1981 | McIrvine | 355/23 |
| 4,635,212 | 1/1987 | Hatazawa | 385/117 |
| 4,866,487 | 9/1989 | Ohuchi et al. | 355/313 |

FOREIGN PATENT DOCUMENTS

| | | | |
|---|---|---|---|
| 63-281174 | 11/1988 | Japan | 395/111 |
| 2-257763 | 10/1990 | Japan | 395/117 |

*Primary Examiner*—Arthur G. Evans
*Attorney, Agent, or Firm*—Burns, Doane, Swecker & Mathis

[57] ABSTRACT

An image forming apparatus for forming images corresponding to image data transmitted from external device by storing the image data in a bit map memory in a bit form and read it out of the bit map memory for printing. When the image data is written to said bit map memory or when the image data is read out of said bit map memory, the image forming apparatus is controlled to switch image orientation recorded on the recording paper with respect to the discharge direction thereof so as to sort recording paper in response to selection of said external device or every series of image data.

7 Claims, 13 Drawing Sheets

IMAGE FORMING APPARATUS

BACKGROUND OF THE INVENTION

1. Field of the Invention

The present invention relates to an image forming apparatus for forming hardcopy images based on print data transmitted from external devices (hereinafter referred to as host device), such as, for example, a personal computer, word processor or like data processing device, or an image reading device.

2. Description of the Related Arts

Conventionally, page printers discharge recording sheets (hereinafter referred to as "sheets") bearing formed images based on printer data transmitted from a host device so as to stack the discharged sheets on a receiving table. Page printers are usually Provided a device for accomplishing a sorting operation wherebY the discharged sheets stacked on the receiving table are removed therefrom and sorted (hereinafter referred to as "sorting operation").

That is, conventional page printers are provided with a sorter device for accommodating distributed sheets in a plurality of bins, a reversing device for inverting the top and bottom sides of the sheet and stacking the inverted sheets on a receiving table, and a slide mechanism for moving the receiving table to shift the position of the accommodated sheets.

When, for example, a five-page document and a ten-page document are continuously printed so that a total of 15 sheets are stacked on the receiving table, the operator can readily sort the sheets of the five-page document and the sheets of the ten-page document.

Methods of controlling the aforesaid devices include a method of control accomplished via command data included with the print data transmitted from a host device, a method of control accomplished via discriminating on the page printer side an interrupt in the input of the print data and like methods. In the previously described conventional image forming apparatus, a mechanical device is attached to perform the sorting operation, thereby increasing both the size and the cost of the apparatus.

SUMMARY OF THE INVENTION

A main object of the present invention is to provide an image forming apparatus compact in size and low in cost.

Another object of the present invention is to provide an image forming apparatus capable of performing a sorting operation without mechanical action.

A further object of the present invention is to provide an image forming apparatus capable of sorting recording sheets by changing the orientation of the image formed on the recording sheet.

A still further object of the present invention is to provide an image forming apparatus connectable to a plurality of external devices and capable of changing the orientation of the images for each external device when the image forming apparatus continually receives image data sequentially from said respective external devices.

These and other objects of the invention are achieved by providing an image forming apparatus for forming images corresponding to image data transmitted from at least one external device onto a recording sheet, said image forming apparatus comprising a data receiving means for receiving image data from an external device, a memory means for converting image data received by the data receiving means into bit configuration and storing said bit data therein, and a control means for controlling to switch image orientation relative to the discharge direction of the recording sheet when the image data is written to the memory means or image data is read from the memory means.

Furthermore, these and other objects of the present invention are achieved by providing an image forming apparatus for forming images corresponding to image data transmitted from external devices onto a recording sheet and connected to a plurality of such external devices, said image forming apparatus comprising a data receiving means for receiving image data from an external device, a memory means for converting image data received by the data receiving means into bit configuration and storing said bit data therein, and a control means for controlling to switch image orientation relative to the discharge direction of the recording sheet when the image data is written to the memory means or the image data is read from the memory means.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 2 is a flow chart showing a data process A of the embodiment shown in FIG. 1a;

DETAILED DESCRIPTION OF THE PREFERRED EMBODIMENTS

The first embodiment of the invention is described below.

Figure 10:
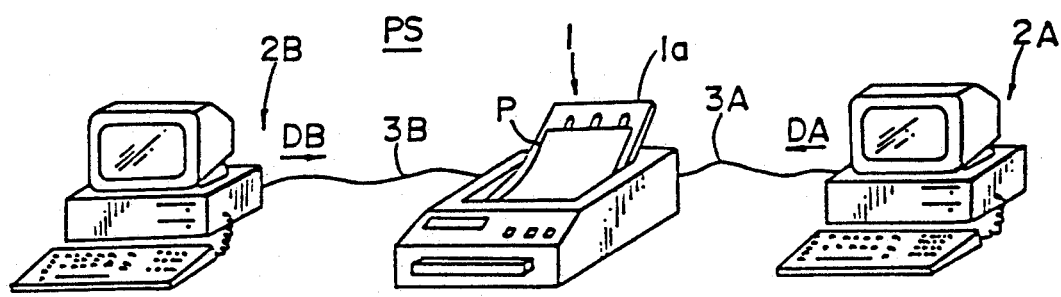
FIG. 10 is an exterior view of the printing system of the present invention.

The printing system PS shown in FIG. 10 comprises a laser printer 1 and two personal computers (hosts) 2A and 2B. The laser printer 1 is connected to each host 2A and 2B by means of the cables 3A and 3B, respectively. The hosts 2A and 2B transmit print data DA and DB comprising image data expressing character and graphic information, and control data, respectively.

The laser printer 1 forms images by means of a well known bit map method for writing image data as dot patterns. The papers P bearing the formed image thereon are discharged and stacked one by one on a tray 1a in the main unit.

Figure 8:
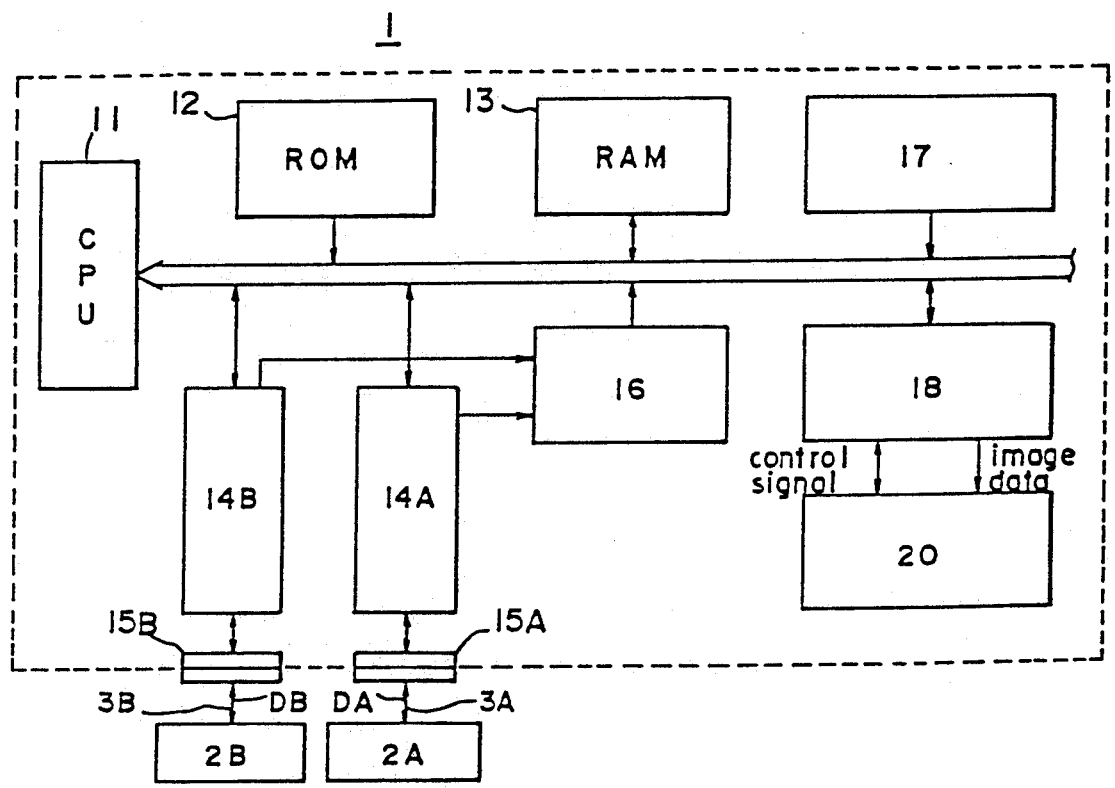
FIG. 8 is a block diagram showing the construction of the essential portion of the laser printer related to the present invention.

FIG. 8 is a block diagram showing the essential construction of the laser printer 1.

The laser printer 1 comprises a central processing unit (CPU) 11 for controlling all operations, a read only memory (ROM) 12 for storing process programs and the like, a random access memory (RAM) 13 for storing data (described later) and used as bit map memory, interfaces 14A and 14B used for input from external devices, an interrupt controller 16, a print engine 20 for forming images via an electrophotographic process using a laser light source, a print engine interface 18, and a dip switch interface 17.

The print data DA from the host 2A are input to the interface 14A through a connector 15A and a cable 3A. The print data DB from the host 2B are input to the interface 14B through a connector 15B and a cable 3B.

The interrupt controller 16 inputs the print data DA and DB to the interfaces 14A and 14B, and transmits the interrupt to the CPU 11. In the CPU 11, a receiving process (FIG. 7), described later, is executed as the interrupt process via the aforesaid pause request.

The laser printer 1 of the present embodiment is capable of assigning priority to either one of the interfaces 14A or 14B relative to the other via dip switches not shown in the drawing. That is, one of the interfaces 14A or 14B given precedence receives the print data and when printing is requested, the printing process is temporarily halted even if a printing process is currently being executed for print data of the other interface 14B or 14A, and the printing process of the interface 14A or 14B given priority is executed as a pause process.

Although the interface 14A connected to the host 2A is given priority in the following description, the interface 14B connected to the host 2B may alternatively be given priority.

Figure 9:
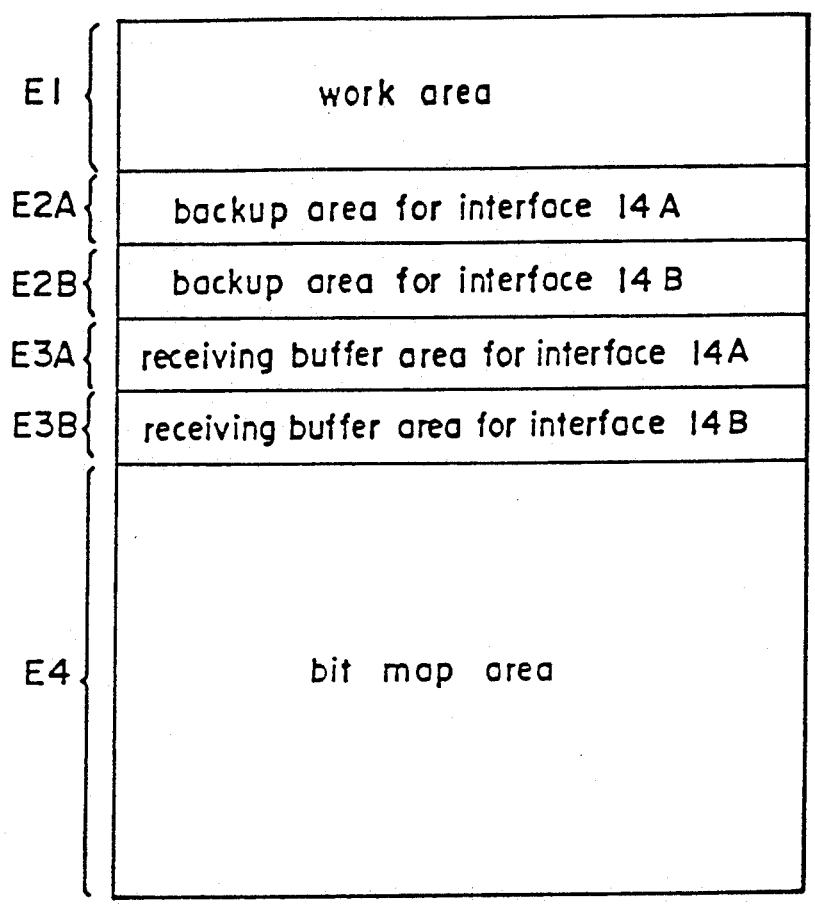
FIG. 9 is an illustration showing the assignment of the RAM memory area.

FIG. 9 is an illustration showing the memory area assignments of the RAM 13.

The RAM 13 is provided a work area E1 for temporary storage of various set values and parameters every time a printing process is executed, backup areas E2A and E2B for storing the print conditions (fonts, margins and the like) assigned by the print data DA and DB, respectively, receiving buffer areas E3A and E3B corresponding to the interfaces 14A and 14B, and a bit map area E4 for writing one-page image data.

Figure 1A:
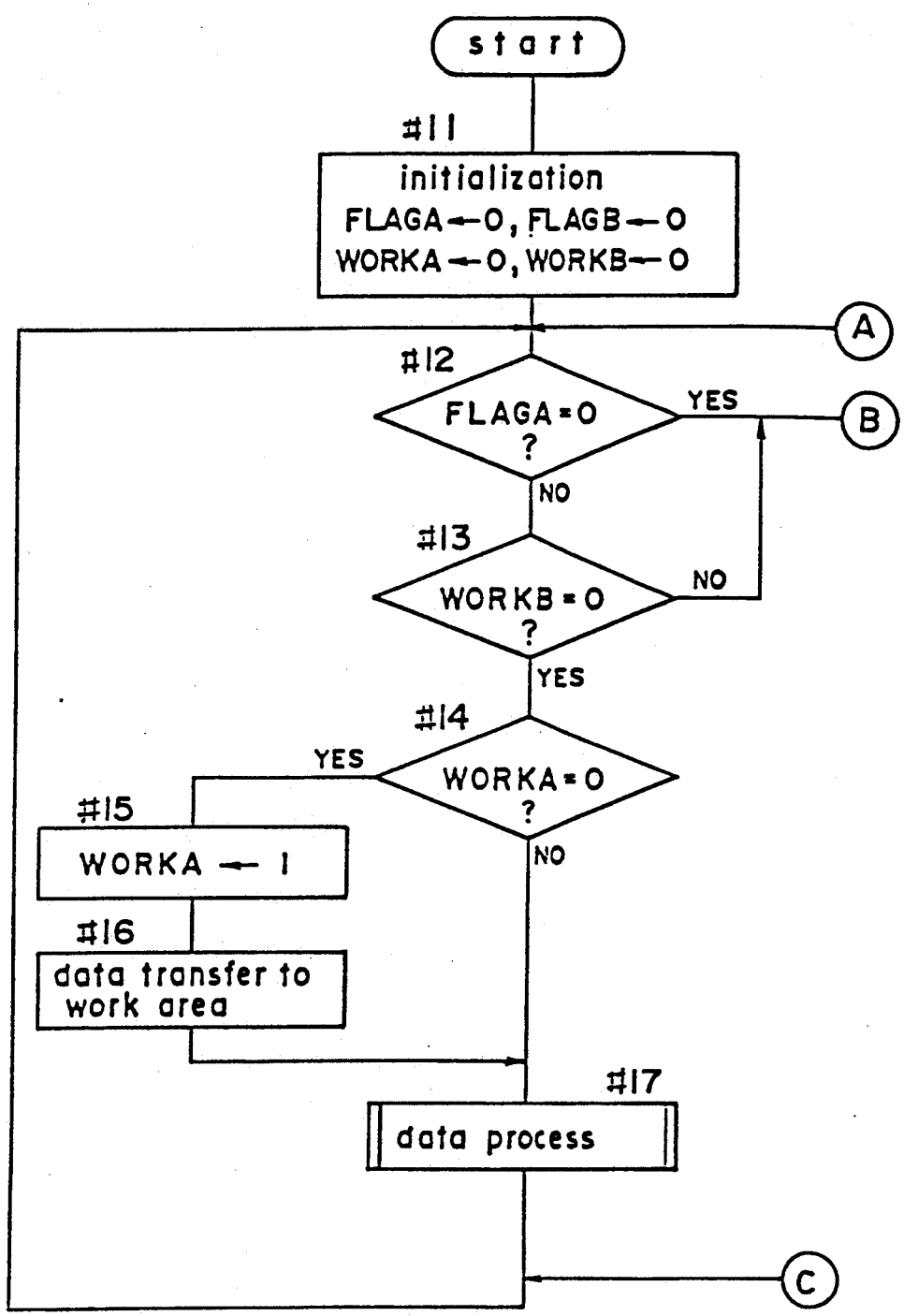
FIGS. 1a and 1b are a main flow chart showing all operations of a first embodiment of the present invention.
Figure 1B:
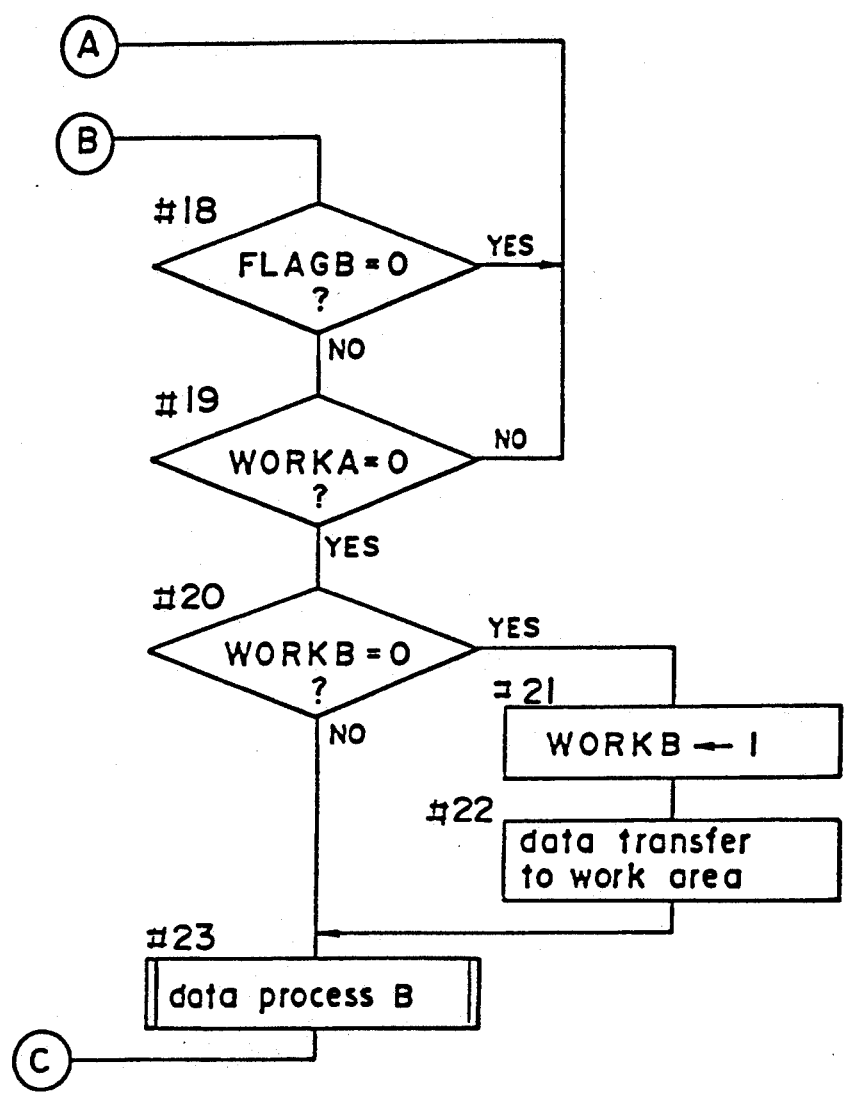

FIGS. 1a and 1b are a flow chart showing the operation of the CPU 11.

When the power unit is turned on, each portion is initialized based on the switch state read through the ROM 12 data and the dip switch interface 17 (step 11). At this time, the flags FLAGA, FLAGB, WORKA and WORKB are all set at [0].

The flags FLAGA, and FLAGB respectively indicate the existence of data in the receiving buffer areas E3A and E3B. In the receiving process described later the aforesaid flags FLAGA and FLAGB are set at [1] when data have been stored in the receiving buffer area E3A and E3B. The flags WORKA and WORKB indicate whether or not image writing is currently executing (on-going dot data development) in the bit map area 4. The flag WORKA corresponds to the interface 14A, and the flag WORKB corresponds to the interface 14B.

Next, in step #12, the flag FLAGA is checked to determine the existence of data in receiving buffer area E3A. If the flag FLAGA is set at [0], the flag FLAGB is checked in step #18 to determine the existence of data in the receiving buffer area E3B. If the flag FLAGB is also found to be set at [0], the routine returns to step #12 and the process of steps #12 and #18 are repeated. That is, the entry of the print data DA and DB transmitted from the host 2A or 2B and the storage of said data in the receiving buffer areas E3A or E3B is awaited.

If the flag FLAGA is found to be set at [1] in step #12, the flag WORKB is checked in step #13. When the flag WORKB is found to be set at [1] in step #13, one-page image information corresponding to the print request transmitted from the host 2B is currently being written to the bit map area E4, so that the routine moves to step #18 and the aforesaid writing continues.

If the flag WORKB is found to be set at [0] in step #13, then the routine continues to step #14 where the flag WORKA is checked. If the flag WORKA is set at [1] in step #14, then the data process A corresponding to the priority interface 14A is executed in step #17.

If the flag WORKA is found to be set at [0] in step #14, said flag WORKA is set at [1] in step #15 because data development in bit map area E4 is renewed, or data development of the next page information is started, and the data of the backup area E2A is transferred to the work area E1 in step #16. Next, the data process A is executed in step #17, and the routine returns to step #12 thereafter.

On the other hand, when the flag FLAGB is found to be set at [1] in step #18, the flag WORKA is checked in step #19 to determine whether or not it is set at [0]. If the flag WORKA is found to be set at [0] in step #19, the flag WORKB is checked in step #20 to determine whether or not it is set at [0]. Then, if the flag WORKB is found to be set at [1] in step #20, the data process B corresponding to the interface 14B is executed in step #23.

When the flag WORKB is found to be set at [0] in step #20, it is reset at [1] in step #21, and the data of the backup area E3B is transferred to the work area E1 in step #22. Then, the data process B is executed in step #23, and the routine thereafter returns to step #12.

Figure 2:
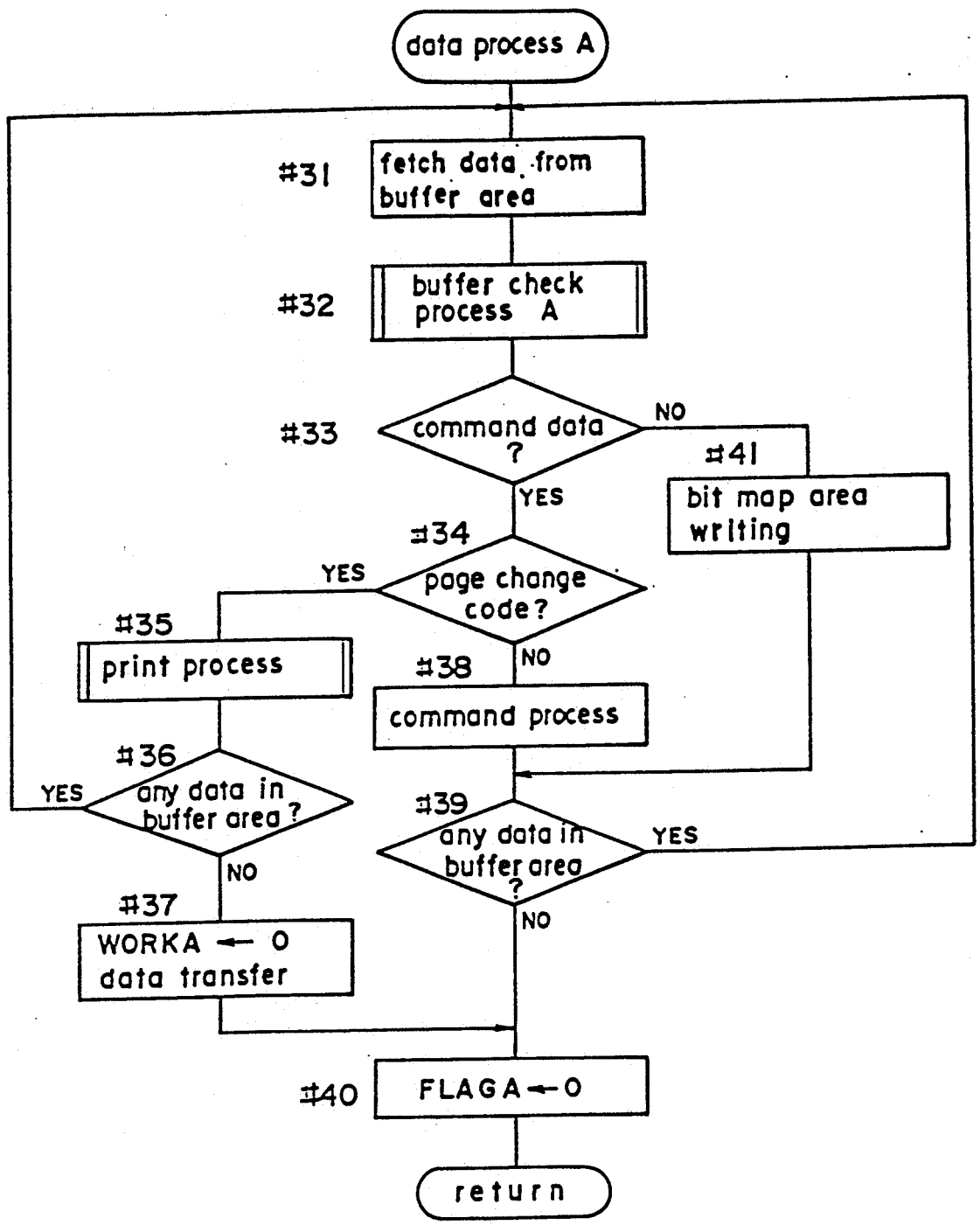

FIG. 2 is a flow chart for the data process A of step #17 shown in FIG. 1a.

In FIG. 2, first, data of a specified length (for example, 1 byte) are fetched from the receiving buffer area E3A (step #31).

Figure 3:
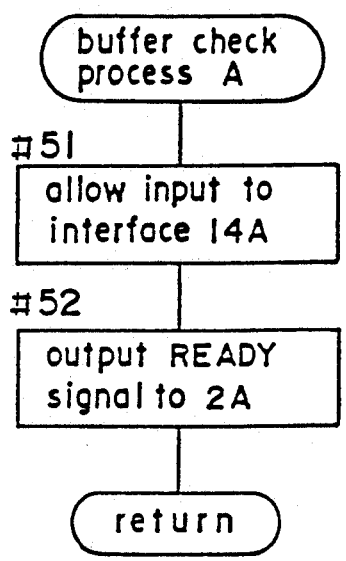
FIG. 3 is a flow chart showing a buffer check process A shown in FIG. 2.

Since an empty area is created in the receiving buffer area E3A when the aforesaid data are fetched, the routine of this process continues and a buffer checking process A is executed in step #32. More specifically, as shown in FIG. 3, input of print data DA to the interface 14A is enabled (step #51), and a ready signal (command data) is output to designate the ready state whereby the laser printer 1 can receive data from the host 2A (step #52). The process in step #51 cancels the input inhibited state occurring when no empty areas remain in the receiving backup area E3A (FULL state). When interface 14A is a centronics model, the status of the laser printer 1 as being capable of reception in the ready state can be discriminated by the host 2A state without specifically requiring the output of a ready signal.

Referring again to FIG. 2, a check is made in step #33 to determine whether or not the data fetched from the receiving buffer area E3A is command data.

If, in step #33, the fetched data are not found to be command data, i.e., the fetched data are image data, then the image data are written to the bit map area E4 in step #41. At this time, when the image data to be written are character codes, the fonts stored in the work area E1 are selected, and the characters corresponding to these character codes are developed as bit data in the bit map area E4 in accordance with the aforesaid selected fonts.

Then, in step #39, a check is made to determine the existence of data in the receiving buffer area E3A, and if data are present the routine returns to step #31. If data are not present, the flag FLAGA is reset at [0] in step #40.

On the other hand, when the data fetched in step #33 are determined to be command data and said command data are found in step #34 to be page change codes expressing the page break of each page, the printing process is executed in step #35 wherein data are read from the bit map area E4, data are transmitted to the print engine 20 and the like.

If no subsequent data are found in the receiving buffer area E3A in step #36, the flag WORKA is reset at [0] in step #37 to end the printing process, and the data are transferred from the work area E1 to the backup area E2A. When subsequent data are found in the receiving buffer area E3A in step #36, the routine returns to step #31 and the next page printing process is executed.

When the data fetched from the receiving buffer area E3A in step #34 are found to be command data other than the aforesaid page feed codes, the command processes are executed in step #38 in accordance with said command data.

Figure 4:
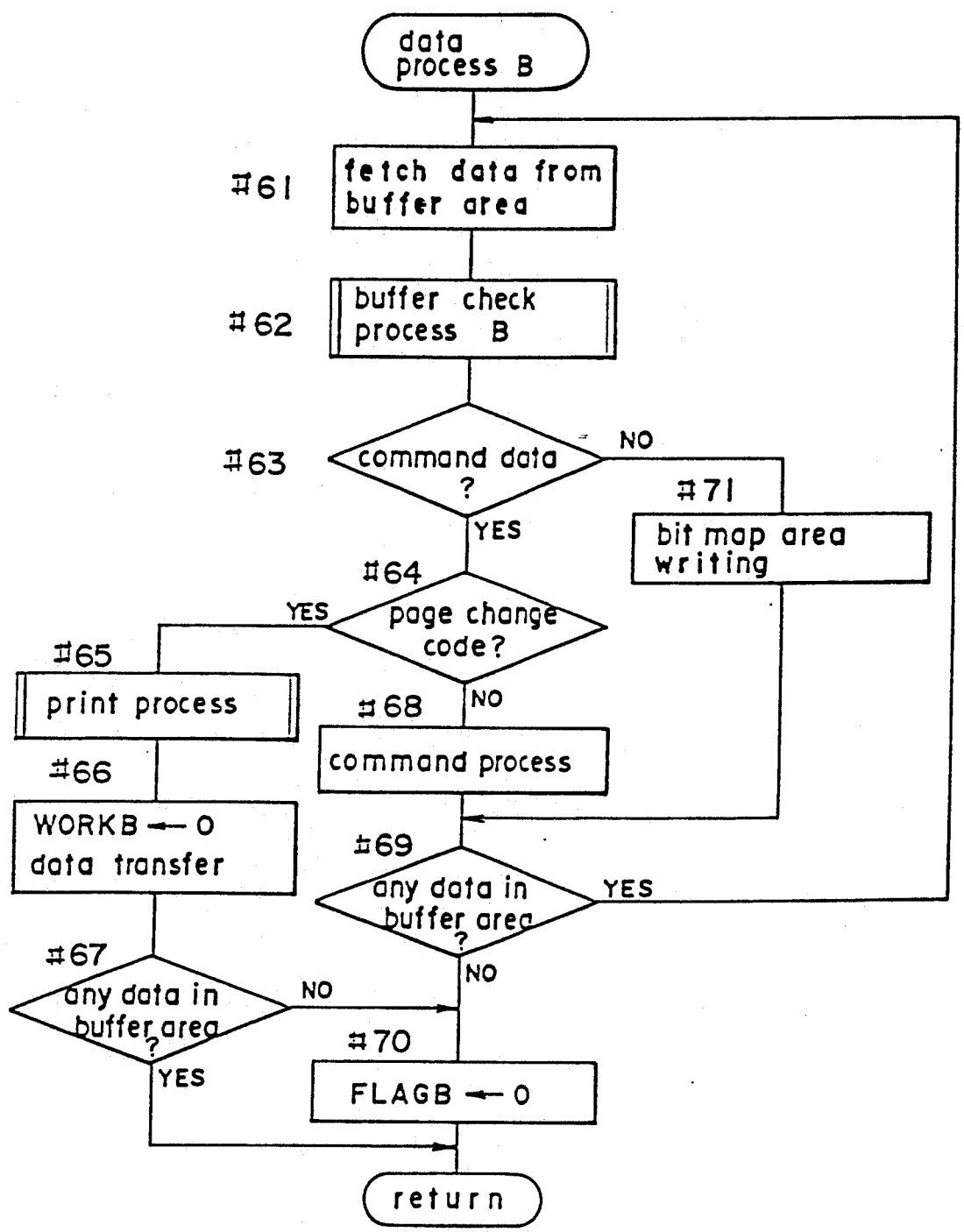
FIG. 4 is a flow chart showing a data process B of FIG. 1b.

FIG. 4 is a flow chart of the data process B of FIG. 1b.

In the data process B, virtually the same Process as the previously described data process A is executed for the data of the receiving buffer area E3B.

Figure 5:
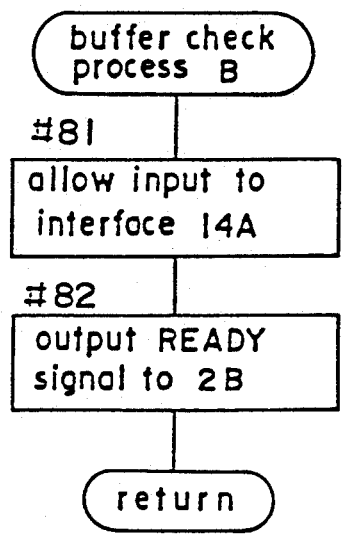
FIG. 5 is a flow chart showing the buffer check B of FIG. 4.

In other words, after the data are fetched from the receiving buffer area E3B, the backup Process B shown in FIG. 5 is executed (steps #61 and #62). Then, a printing process, command process, and writing of the data of bit map area E4 are executed (steps #63, 64, 65, 68 and 71) in accordance with the various data types.

In the data process B, after the printing process has been executed in step #65, the flag WORKB is reset at [0] as the print completion process in step #66 without regard to the existence or absence of data in the receiving buffer area E3B, and finally the data transfer from the work area E1 to the backup area E2B is executed. In other words, the process is temporarily halted every time a onepage segment printing process is completed even when other page segment data remain in the receiving buffer area E3B, then the program returns to the main routine.

Thus, in the laser printer 1, when the print data DA are input from the host 2A during the execution of the printing process for the host 2B, i.e., the writing of the bit map area E4 based on the print data DB, and data output to the print engine 20, the printing process for the executing host 2B is Paused after each page break, or alternatively, the printing process for the host 2A is given priority in execution. Thereafter, when the printing process for the host 2A is completed, and the pause printing process for the host 2B is restarted.

Figure 6:
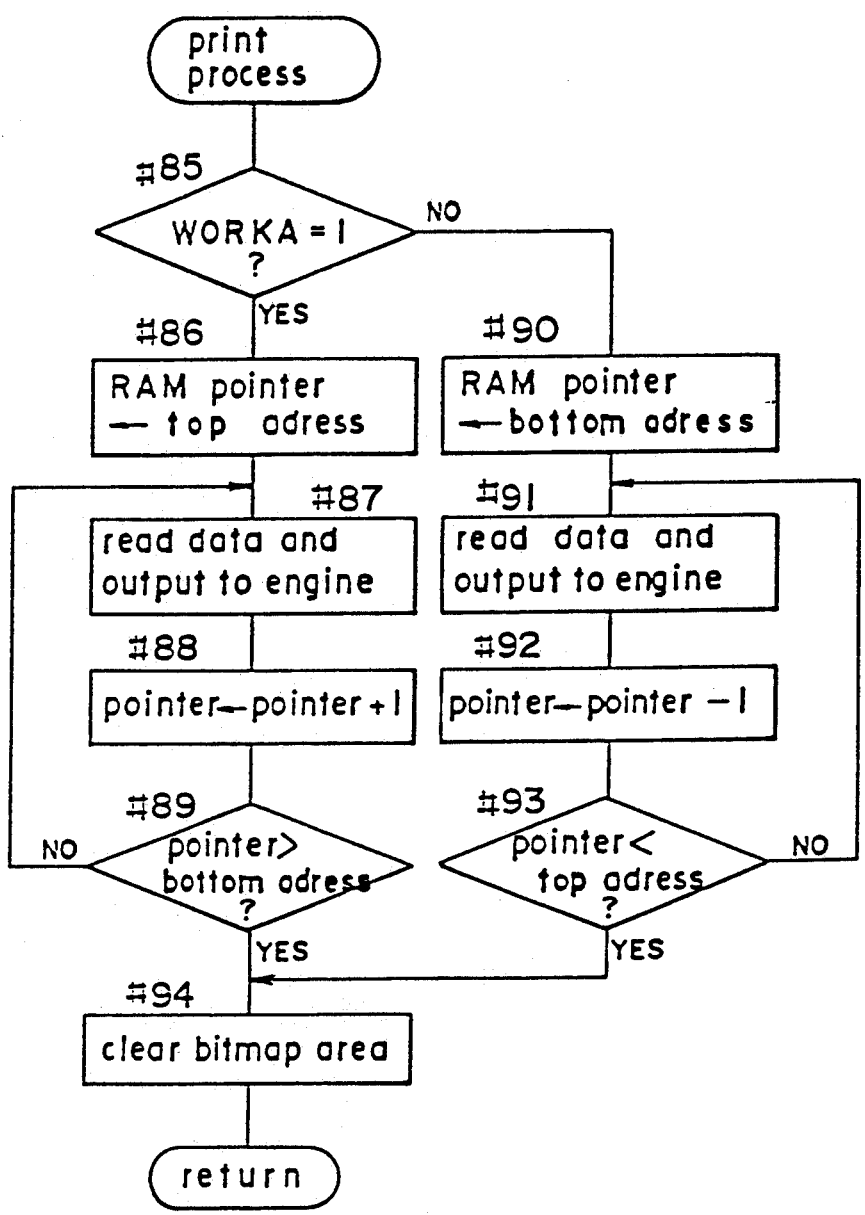
FIG. 6 is a flow chart showing the printing process of FIGS. 2 and 4.

FIG. 6 is a flow chart of the printing processes of FIGS. 2 and 4.

In FIG. 6, the initial check of the flag WORKA is made to determine whether or not the flag is set at [1].

When the flag WORKA is set at [1], printing is executed for the host 2A. In this case, the top address of the bit map area E4 is set by a pointer indicating the address in RAM 13 (step #86).

Then, the pointer address data are read from the bit map area E4 and transmitted to the Print engine 20, whereupon the pointer is incremented. The aforesaid process is repeated until the bottom address of the bit map area E4 is reached (steps #87, 88 and 89). The bit map area E4 is cleared when the reading of the data from all parts of the bit map area E4 has been completed (step #94). The reading of the bit map area E4 is accomplished according to the synchronization signals transmitted from the print engine 20 and in correspondence with the margin values stored in the work area E1. In parallel with the aforesaid process, the photosensitive member in the print engine 20 is exposed to flashing light from a laser light source.

On the other hand, when the flag WORKA is set at [0] and printing is executed for the host 2B, the bottom address of the bit map area E4 is set by the pointer indicating the address in RAM 13 (step #90).

Then, the pointer address data are read from the bit map area E4 and transmitted to the print engine 20, whereupon the pointer is decremented. The aforesaid process is repeated until the top address of the bit map area E4 is reached (steps #91, 92 and 93). The bit map area E4 is cleared when the reading of the data from all parts of the bit map area E4 has been completed (step #94).

That is, when printing for the host 2A, the data are read in the same sequence as the writing sequence from the top address to the bottom address of the bit map area E4. In contrast, the data of the bit map area E4 is read in the reverse to the writing sequence when printing for the host 2B.

Figure 11A:
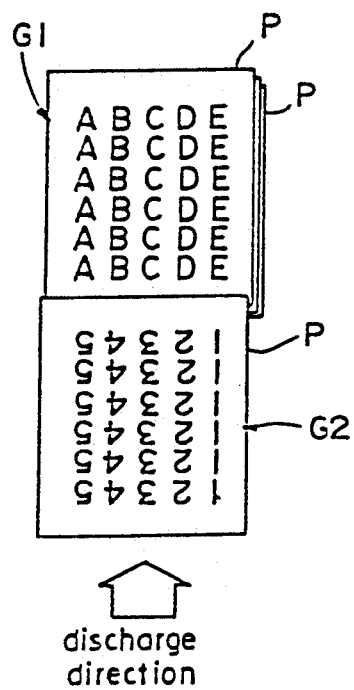
FIG. 11 is an illustration showing the condition of the discharged sheets.
Figure 11B:
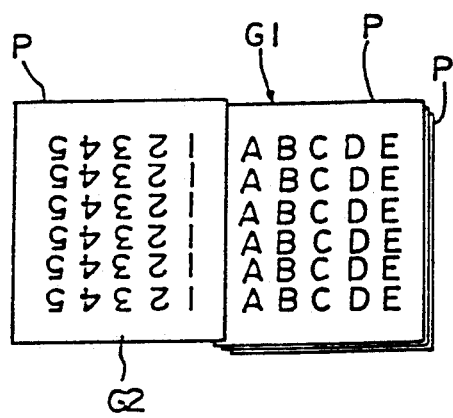

Accordingly, as shown in FIG. 11, in the laser printer 1 the orientation of the image G1 comprising the letters "A, B, C, D, E" from the host 2A, and the orientation of the image G2 comprising the numbers "1, 2, 3, 4, 5" from the host 2B are mutually rotated 180° relative to the paper discharge direction (indicated by arrows in the drawing). That is, because the images G1 and G2 are inverted in one orientation and an opposite orientation such that sheets P can be sorted by those corresponding to the host 2A and those corresponding to the host 2B by means of the directional orientations of the images G1 and G2 even when the discharged sheets P are stacked. FIG. 11a shows an example wherein the orientations of the images G1 and G2 coincide with the discharge direction of the sheets P, whereas FIG. 11b shows an example wherein the orientations of the images G1 and G2 are perpendicular to the discharge direction of the sheets P.

Figure 7A:
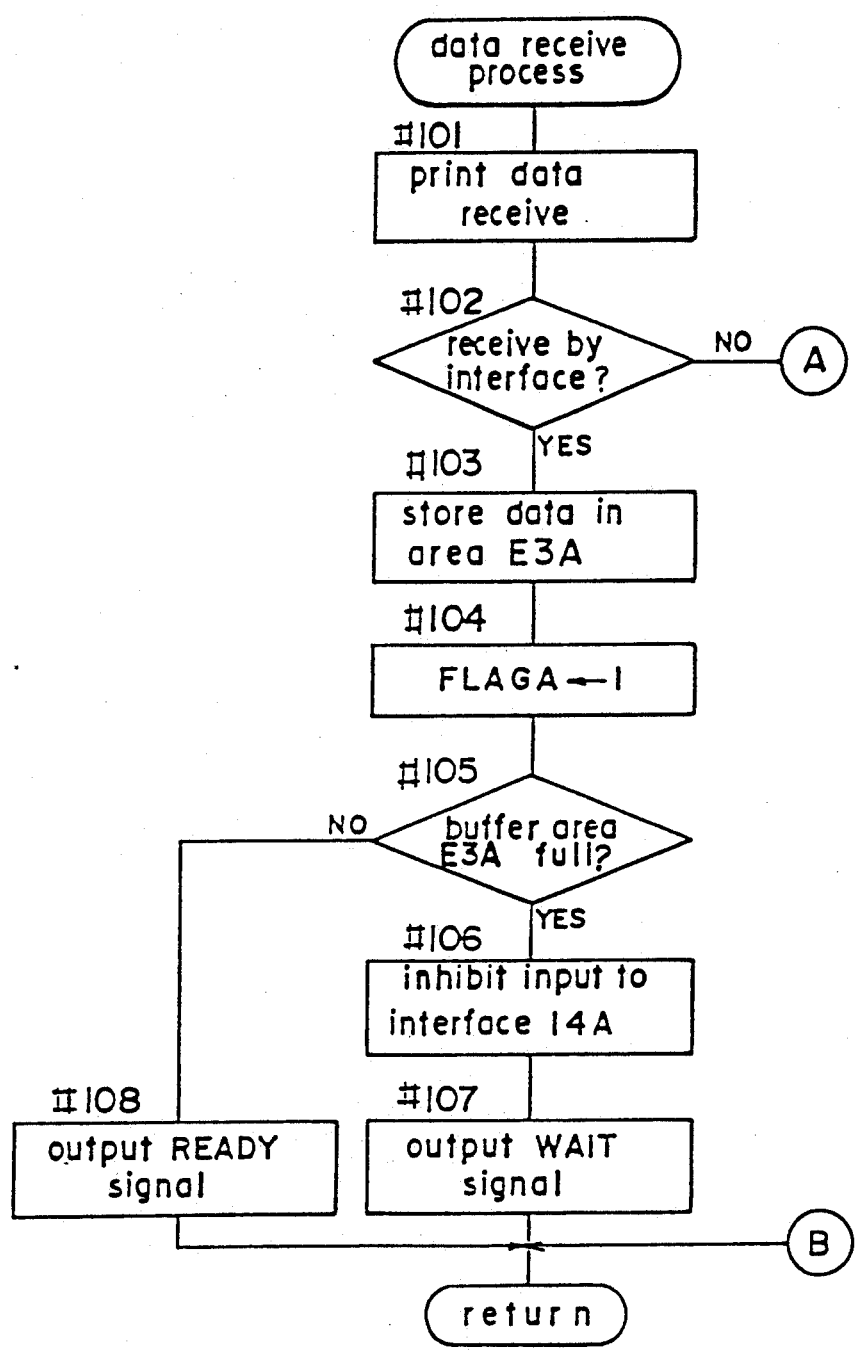
FIGS. 7a and 7b are a flow chart showing the receiving process of the first embodiment of the invention.
Figure 7B:
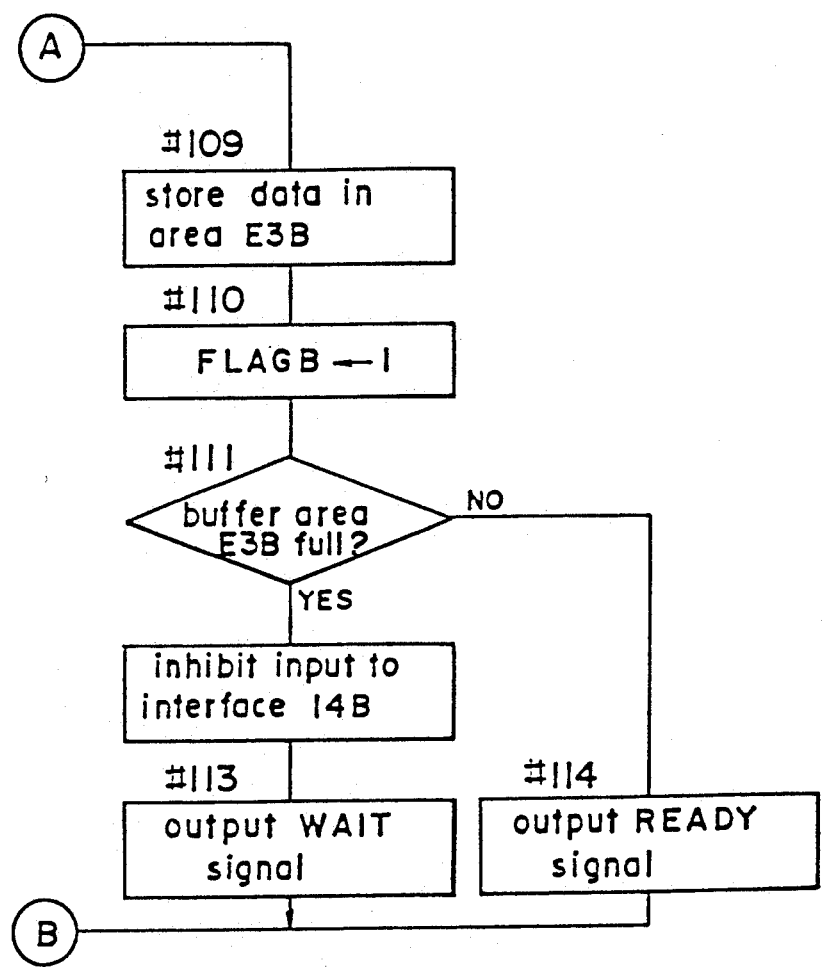

FIGS. 7a and 7b are a flow chart of the receiving process.

The main routine of the receiving process is executed whenever required as the pause routine of the main routine of FIG. 1 in correspondence with the input of print data DA and DB to the interfaces 14A and 14B.

When print data is received and a pause process is requested by the interrupt controller 16 in step #101, the CPU 11 checks to determine whether the reception is from the interface 14A or 14B in step #102. If the reception is found to be from the interface 14A in step #102, then the print data DA are stored in the receiving buffer area E3A in step #103, and the flag FLAGA is set to [1] in step #104.

Next, the receiving buffer area E3A is checked in step #105 to determine whether or not it is full. If the buffer area is not full, a ready signal is output to the host 2A in step #108, whereas if the buffer area E3A is full in step #105, input is inhibited to the interface 14A in step #106. A wait signal is output in step #107 to alert the host 2A to the full buffer condition.

On the other hand, if the reception is determined to be from the host 2B in step #102, the print data DB are stored in the receiving buffer area E3B in step #109, and the flag FLAGB is set at [1] in step #110.

When the receiving buffer area E3B is not found to be full in step #111, a ready signal is output to the host 2B, whereas when the buffer area E3B is full in step #111, output to the interface 14B is inhibited in step #112, and a wait signal is output to the host 2B in step #113.

Figure 12:
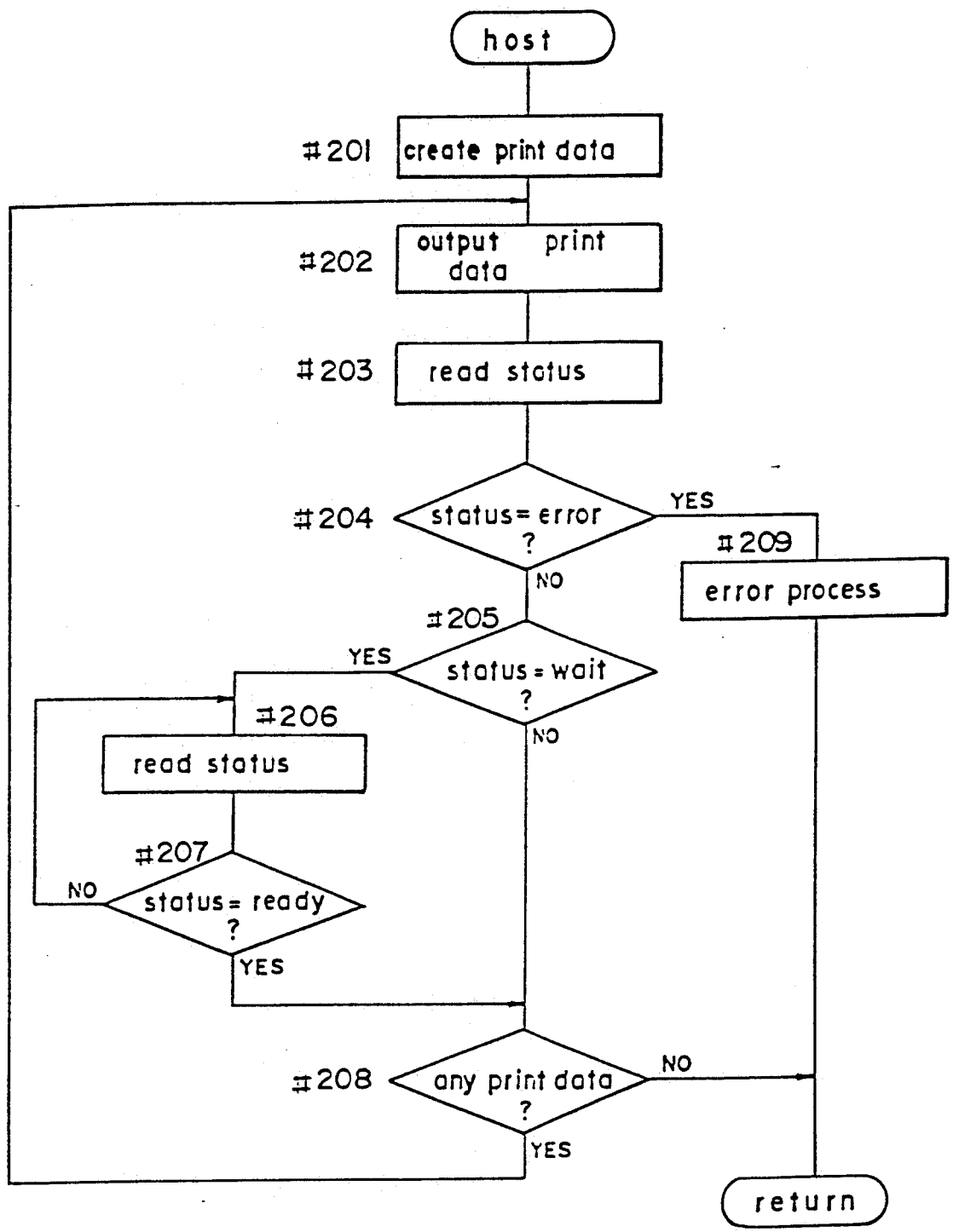
FIG. 12 is a flow chart briefly showing the host operations.

FIG. 12 is a flow chart showing the operations of the hosts 2A and 2B.

After the print data DA and DB are created in step #201, said print data DA and DB having a specified length are output to the laser printer 1 in step #202, i.e., a print request is issued.

Subsequently, the status of the laser printer 1 is read in step #203, and if an error state exists wherein the status indicates a reception abnormality in step #204, then an error process corresponding to the type of error is executed in step #209. If the status does not indicate an error state in step #204, then a wait state obtains in step #205, and the status of the laser printer 1 is read again in step #206, and the ready state is awaited in step #207.

When the status of the laser printer 1 indicates a ready state, the existence of print data DA and DB for transmission is checked in step #208. If data exists, the routine returns to step #202 and the next data are transmitted.

In the previously described embodiment, the directional orientations of the images G1 and G2 on the sheets P discharged in a uniform direction are made mutually dissimilar by switching the sequence of reading the data from the bit map area E4, as illustration in FIG. 6. Alternatively, the directional orientations of the images G1 and G2 may be made mutually dissimilar by switching the sequence of writing data to the bit map area E4.

Figure 13:
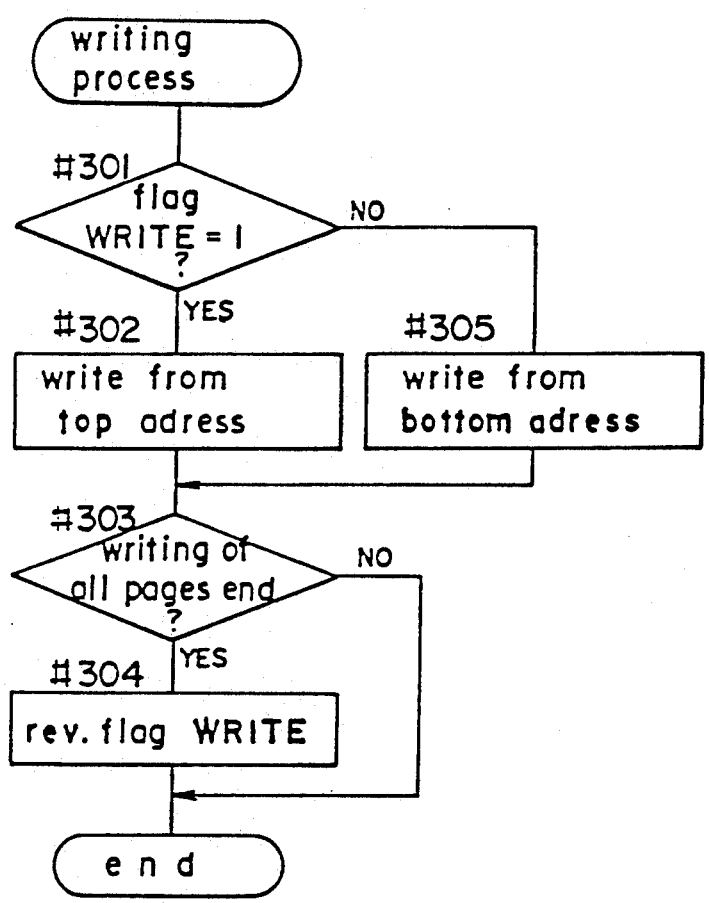
FIG. 13 is a flow chart showing the writing process of another embodiment of the invention.

FIG. 13 is a flow chart of the writing process relating to a second embodiment of the invention. This routine executes a process instead of the step #14 of FIG. 2 or the step #71 of FIG. 4.

First, the WRITE flag setting the writing sequence is checked in step #301. The WRITE flag is set, for example, at [1] at initialization when power is turned on.

When the WRITE flag is set at [1], dot data are developed sequentially from the top address to the bottom address of the bit map area E4, and the image is written (step #302). When the WRITE flag is set at [0], dot data are developed sequentially from the bottom address to the top address of the bit map area E4 (step #305). When one page segment has been completed in the writing via the aforesaid processes, the bit map area E4 is cleared after the data has been transmitted to the print engine 20 in the printing process previously described for FIG. 6. The subsequent page segment is written using an identical sequence.

Thereafter, in step #303, a check is made to determine whether or not the writing of all page segments corresponding to a single print request has been completed. This determination is accomplished, for example, by existence of data in receiving buffer areas E3A or E3B corresponding to the written image. That is, if no data exists, the writing of the print data DA and DB received from the hosts 2A and 2B is completed.

When the writing of all page segments is completed, the set/reset state of the WRITE flag is reversed (step #304). Thus, a second cycle writing sequence is the reverse sequence to the previous cycle writing sequence.

As previously described, when the printing process for the host 2B is pause at each page break so as to give priority to the printing process for the host 2A, the WRITE flag is reversed at the pause time and the printing restart time.

In the aforesaid embodiment, a check is automatically made to determine whether or not the input of print data DA and DB from the host 2A or 2B have paused via the existence of data in the receiving buffer areas E3A or E3B. The image orientation can be switched by the aforesaid process, such that command data generation is not required for a special sorting operation on the host 2a or 2B side.

Although the orientation of the images G1 and G2 corresponding selection of the two hosts 2A and 2B have been switched in the first embodiment described above, said switching may alternatively be accomplished according to the print state set by the command data included in the print data DA and DB. For example, when printing three copies of a five-page document wherein each page of the document is printed on three sheets, the orientation of the images can be switched each time the document page is changed, or the orientation of the images can be changed for each copy when a single of each page is printed.

Furthermore, although the present embodiment has been described in terms of a laser printer 1 connected to two hosts 2A and 2B, the present invention may also be adapted for use with an image forming apparatus connected to a single external device such as, for example, an image reader (external device), and the printing portion of a digital copying machine or facsimile machine.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus for forming images corresponding to image data transmitted from at least one external device onto recording paper, comprising:
   receiving means for receiving image data from an external device,
   memory means for storing the image data received by said receiving means by converting into bit form, and
   control means for switching, when the image data is written to said memory means or when the image data is read out of said memory means, image orientation recorded on the recording paper with respect to a discharge direction thereof after completion of each unit of a printing job so as to distinguish each unit from other units.

2. The image forming apparatus as claimed in claim 1 being connected to a plurality of external devices, wherein said control means controls to switch the image orientation in response to the external devices.

3. The image forming apparatus as claimed in claim 2, wherein each said external device is connected to said image forming means through a connector, and said control means switches the image orientation in response to the connector through which the image data is input.

4. The image forming apparatus as claimed in claim 1, wherein said control means switches the image orientation after each series of image data.

5. The image forming apparatus as claimed in claim 1, wherein said control means switches the image orientation in response to a command from the external device.

6. The image forming apparatus as claimed in claim 1, wherein when said control means switches the image orientation, the orientation of said image is reversed.

7. The image forming apparatus as claimed in claim 1, wherein said receiving means further receives a control data together with the image data for each unit of the printing job, and said control means controls to switch the image orientation in response to the control data.

* * * * *